(12) United States Patent
Tomiyama

(10) Patent No.: US 6,324,760 B1
(45) Date of Patent: Dec. 4, 2001

(54) METHOD OF MAKING GAS GENERATOR FOR AIR BAG

(75) Inventor: Shogo Tomiyama, Himeji (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 09/704,577

(22) Filed: Nov. 3, 2000

Related U.S. Application Data

(62) Division of application No. 09/296,403, filed on Apr. 23, 1999, now Pat. No. 6,170,869, which is a division of application No. 08/848,601, filed on Apr. 29, 1997, now abandoned.

(30) Foreign Application Priority Data

Feb. 10, 1997 (JP) .................................................... 9-026750

(51) Int. Cl.⁷ .............................. B23P 15/00; B60R 21/26
(52) U.S. Cl. ................... 29/890.124; 280/741; 73/150 R
(58) Field of Search ........................... 29/890.24, 407.08, 29/407.05, 407.01, 426.1, 888, 888.02; 280/736, 741; 73/52, 73, 76, 150 R

(56) References Cited

U.S. PATENT DOCUMENTS

| | | |
|---|---|---|
| 4,836,878 | 6/1989 | Irving et al. . |
| 5,087,643 | * 2/1992 | Truong . |
| 5,149,129 | 9/1992 | Unterforsthuber et al. . |
| 5,229,206 | * 7/1993 | Groves . |
| 5,325,713 | * 7/1994 | Furst et al. ........................ 73/150 R |
| 5,431,103 | 7/1995 | Hock et al. . |
| 5,458,371 | 10/1995 | Fulmer et al. . |

FOREIGN PATENT DOCUMENTS

| | | |
|---|---|---|
| 0 694447 A2 | 1/1996 | (EP) . |
| 0 705739 A1 | 4/1996 | (EP) . |
| 0 800964 A2 | 10/1997 | (EP) . |
| 64 6156 B2 | 2/1989 | (JP) . |
| 64 6157 B2 | 2/1989 | (JP) . |
| 3 208878A | 9/1991 | (JP) . |
| 98 02336 A | 1/1998 | (WO) . |

* cited by examiner

Primary Examiner—I Cuda Rosenbaum

(57) ABSTRACT

An inflator showing stable operating capability is provided wherein an opening of a gas generator for an air bag which communicates with the atmosphere is closed by a moisture-proof seal tape that is able to prevent a gas generating agent in the gas generator from absorbing moisture or water vapors. The opening of the gas generator which communicates with the atmosphere is closed by the moisture-proof seal tape comprising a substrate and an adhesive. The water vapor permeability of the seal tape is such that the rate of increase in the weight due to moisture absorption of the gas generating agent stored in the gas generator is 2.0% or smaller when the gas generator is left for 20 days in a constant-temperature, constant-humidity chamber kept at a temperature of 80° C. and humidity of 90%.

11 Claims, 3 Drawing Sheets

METHOD OF MAKING GAS GENERATOR FOR AIR BAG

This application is a divisional of application Ser. No. 09/296,403, filed on Apr. 23, 1999 now U.S. Pat. No. 6,170,869 which is a divisional of abandoned application Ser. No. 08/848,601, filed on Apr. 29, 1997, the entire contents of which are hereby incorporated by reference.

DETAILED DESCRIPTION OF THE INVENTION

1. Field of the Invention

The present invention relates to an air bag system for protecting a passenger from impacts, and in particular to a gas generator for an air bag which effectively prevents a gas generating agent from absorbing moisture or water vapors in the atmosphere, and has a stable operating capability.

2. Description of the Prior Art

When a motor vehicle, such as an automobile, collides with something at a high speed, passengers in the vehicle may crash into hard or dangerous parts, such as a steering wheel or front glass, inside the vehicles, due to inertia. To prevent the passengers from being injured or killed by such crashes, an air bag system for an automobile has been developed wherein a bag is rapidly inflated by gases generated by a gas generating agent. The gas generating agent suitable for the automobile air bag system is required to satisfy very severe conditions. First, the bag must be inflated in a considerably short period of time, normally within 40 to 50 milliseconds. Gas generating agents generally used at present, which contain alkali metal salt or alkaline earth metal salt of hydrazoic acid, such as sodium azide, as a base, satisfy those conditions, and exhibit excellent characteristics.

Non-azide gas generating agents have also been developed which may replace the agents containing sodium azide as a base. For instance, Japanese laid-open Patent Publication No. 3-208878 discloses compositions containing tetrazole, triazole, or their metallic salts, and an oxygen containing oxidizing agent containing alkali metal nitrate, such as sodium nitrate, as major components. On the other hand, Japanese Patent Nos. 64-6156, 64-6157 disclose a gas generating agent having a metallic salt of bitetrazole compound containing no hydrogen as a major component. Further, Japanese laid-open Patent Publication No. 3-208878 discloses a gas generating agent having a transition metal complex of aminotetrazole as a main component. Many of the above-indicated compositions for the gas generating agent, however, contain oxidizing agents or others which exhibit considerably high degrees of hygroscopic property or deliquescence. Since the amount of water contained in the gas generating agent has a great influence on its burning characteristic, the conventional gas generator employs various methods for preventing the gas generating agent stored therein from absorbing moisture or water vapors. For example, the gas generating agent is contained in a thin, aluminum container, which is air-tightly closed by a lid with a sealing agent, and this container is mounted in the gas generator. This method, however, results in an increased cost, and makes it difficult to reduce the size of the inflator container. To solve this problem, a gas generator having a seal tape attached to its gas discharge ports has been employed, so as to prevent moisture from entering the generator. The seal tape is formed by coating a moisture-proof film with an adhesive, such as a thermosetting adhesive or pressure sensitive adhesive. The use of such a seal tape makes it possible to significantly reduce the cost, and reduce the size of the gas generator. However, this seal tape is not so good in terms of a water vapor permeability, as compared with the above-described moisture-preventing method. Namely, the gas generator to which the seal tape is attached has a portion (side face of the tape) where the interior of the gas generator is shield from the exterior thereof strictly only by the adhesive of the seal tape. However, generally these adhesives contain chemical substances, such as those containing rubber, acrylic, silicone, or polyvinyl ether, as major components, for improving the adhesive strength or shear adhesion, and these chemical substances have relatively high water solubility or water dispersibility, thus allowing more or less water vapors to pass through the portion of the seal tape where only the adhesive is present, into the interior. Thus, the known seal tape cannot completely prevent moisture from entering the generator, and there is a possibility that water vapors permeate through the seal tape when the moisture reaches a certain level.

As described above, the main component of the adhesive generally used in the seal tape contains rubber, acrylic, silicone, or polyvinyl ether having relatively high water solubility or water dispersibility, so as to improve the adhesive strength or shear adhesion. When the seal tape is attached to a housing wall of the gas generator to close gas discharge ports formed therethrough, and left under normal environments, for example, water vapors in the atmosphere are more or less moved through a portion where only the adhesive serves to block the water vapors, and enter the interior of the gas generator. When the seal tape is used for blocking entry of the water vapors, therefore, it is necessary to use a material having an excellent moisture-preventive property, while assuring the bonding and holding functions of the seal tape.

SUMMARY OF THE INVENTION

It is therefore an object of the invention to provide a gas generator for an air bag using a seal tape for preventing water vapors from entering an inflator, so that it is free from the above problems encountered in the prior art.

As a result of diligent studies in an attempt to solve the above problems, the present inventirs surprisingly found that if an opening of the gas generator that communicates with the atmosphere is closed by a seal tape which provides 2.0% or less of increase in the weight of the gas generator due to moisture absorption by its gas generating agent after the generator is left for a while under humidified environments, the seal tape can accomplish moisture-proofing of the gas generating agent, with a significantly small influence on the performance of the gas generator for an air bag. The inventors have reached the present invention based on this finding.

Namely, the present invention relates to a gas generator for an air bag characterized in the tan opening formed through the gas generator to communicate with the atmosphere is closed by a moisture-proof seal tape comprising a substrate and an adhesive, a rate of increase in a weight due to moisture absorption by a gas generating agent stored in the gas generator is not higher than 2.0% when the gas generator is left for 20 days in a constant-temperature, constant-humidity chamber kept at a temperature of 80° C. and a humidity of 90%.

In the gas generator of the present invention, the seal tape is firmly pressed by hand and attached to its inner cylindrical portion or housing to completely close communication holes open to the atmosphere, such as through-holes formed in the inner cylindrical portion, and gas discharge ports formed through the housing. The above-indicated rate of increase in the weight is obtained by measuring the weight of this gas generator after leaving it for 20 days in a constant-temperature, constant-humidity chamber kept at a temperature of 80° C. and humidity of 90%, and calculating a difference between the thus measured weight and the weight measured before it is left in the constant-temperature, constant-humidity chamber, so as to obtain a percentage of this difference with respect to the gas generating agent. In this case, in particular, the rate of increase in the weight is considered as the rate of water-vapor absorption of the gas generator.

Before and after the gas generator of the present invention is subjected to the above-described test, the combustion evaluation of the gas generator was carried out. As a result, a significant difference was not observed between the performance of the gas generator before the humidified-condition test, and that after the test. Thus, the gas generator, in which the seal tape of the present invention prevents moisture from entering the housing, exhibits stable operating capability or performance without being affected by water vapors in the atmosphere.

In particular, the seal tape used in the present invention preferably has a water vapor permeability as described below.

Namely, the seal tape for preventing moisture from entering the gas generator has a water vapor permeability with which the rate of increase in the weight due to moisture absorption of the gas generating agent per day is equal to or lower than 0.050%, when measured under the following conditions.

The conditions for measuring the water vapor permeability of the seal tape are as follows.

Any container may be used in the experiment, provided that it satisfies the following conditions.
1. The container is formed of a material having 100% of moisture-preventive property, and shows no chemical changes and no significant expansion at a temperature of not higher than 100° C. and a humidity of 100%. This container comprises at least a lid, a container body, and a member for ensuring air tightness of the container.
2. The container can be air-tightly closed, and has a 3 mm-diameter circular hole formed through the lid.
3. The content volume of the container is not smaller than 1 cc.

Using the container that satisfies the above conditions, the container is filled with at least 0.80 g of the gas generating agent, and the moisture-proof seal tape of the inflator formed into a square of 10 mm×10 mm is attached to the hole in the lid while a pressure of 5 kg/cm$^2$ is uniformly applied to a surface of the tape, such that the center of the seal tape coincides with the center of the hole. Then, after the weight of the gas generating agent is measured in advance, the container is rapidly filled with the gas generating agent, and the lid is mounted and fixed in position so as to assure air tightness. After the air-tight container is left for 5 days to 25 days at a temperature of 80° C. and a humidity of 90%, the container is disassembled, the weight of the gas generating agent is measured, and a rate of increase in the weight per day with respect to that of the gas generating agent is obtained.

When the seal tape, which limits the rate of increase in the weight due to moisture absorption of the gas generating agent to less than 0.050% per day under the above conditions, is used in the gas generator for preventing the gas generating agent from absorbing moisture, the operating capability of the gas generator is less likely to be influenced by water vapors transmitted from the atmosphere.

The seal tape used in the present invention preferably has a width that is 2 to 3.5 times the diameter of through-holes, such as gas discharge ports of the inflator, which are closed by the seal tape attached thereto. It is desirable that each of the spacing between the upper end portion of the through-holes and the upper edge of the seal tape and the spacing between the lower end portion of the through-holes and the lower edge of the seal tape is about 0.5–1.25 times the diameter of the through-holes. The seal tape desirably has a substrate formed from an aluminum foil. If the aluminum foil has a thickness of 25 $\mu$m or greater, the water vapor permeability is normally zero, and in this case the seal tape can be formed into a desired shape and attached with increased easiness, assuring high resistance to environments. For instance, the seal tape can be formed from an aluminum foil having a thickness of 50 $\mu$m or greater, and an adhesive having a thickness of 30 $\mu$m or greater. Where the thickness of the aluminum tape is 200 $\mu$m or greater, the aluminum foil is unlikely to rupture even when gases are generated by burning the gas generating agent, and the pressure inside the inflator container may rapidly increase, resulting in breakage of the container at its joints. In such a case, the gas generator may fail to perform normal operations, and the container thus broken, its components, and uncooled gases may burst out, and possibly inflict injuries on a person or passenger. Accordingly, the thickness of the tape is desirably controlled to be in the range of 50 to 150 $\mu$m when the aluminum foil is used as the substrate of the seal tape.

Further, a cover film, such as a resin film formed of fluororesin, may be provided on the substrate of aluminum foil, for example, so as to improve the corrosion resistance of the seal tape.

The substrate of the seal tape may be attached to a certain location by use of various kinds of adhesives, such as a pressure-type adhesive or a hot-melt adhesive. The hot-melt adhesive that is fused by application of heat is preferably used to securely bond the substrate to the certain location. The ratio of the thickness of the adhesive to that of the substrate of the seal tape is desirably in the range of 0.2 to 5.0. A pressure sensitive adhesive may be desirably used as the adhesive. An acrylic- or silicone-containing adhesive is generally used as the pressure sensitive adhesive that is desired to exhibit high durability for a long period of time. The acrylic adhesive may contain acrylic ester as a main component, whose content is 40% or greater, wherein the number of carbons in a hydrocarbon radical bonded by reaction of alcohol in the ester is desirably 3 or greater, since properties of such an adhesive do not change even at below-freezing temperature that is possible in the global atmosphere. The silicone-containing adhesive desirably contains silicone rubber and silicone resin as main components. The adhesive strength or holding power (shear adhesion) of the adhesive may be generally measured based on JIS 0237, and when the measurement is effected on the seal tape having a width of 20 mm, the adhesive desirably has an adhesive strength of 1 kgf or greater when it is peeled by 180° C. Regarding the shear adhesion, it is desirable that the seal tape does not fall off after one hour, and is displaced or shifted by a distance of not larger than 1 mm.

In the inflator using the above-described moisture-proof seal tape for the gas generator, igniting means actuated upon detection of an impact, gas generating means including a gas generating agent that burns to generate gases, and a filter for cooling the generated gases are accommodated in the gas generator for an air bag, and through-holes, such as gas discharge ports, are closed by the seal tape for preventing moisture from entering the gas generator.

The housing of the gas generator of the present invention may be formed by welding a diffuser shell having gas discharge ports, to a closure shell having an igniter storage opening.

In the above-indicated housing, there may be suitably accommodated members necessary to constitute the gas generator for an air bag, which include: igniting means comprising an igniter that is actuated by an impact, and a transfer charge that is ignited or fired by actuation of the igniter; gas generating agent that is fired by the ignited transfer charge to generate combustion gases; and a coolant/filter for removing combustion residues from the combustion gases thus generated while cooling the gases.

As the igniting means, any of igniters that are electrically ignited or mechanically ignited may be used. The mechanical igniter is obtained by combining a sensor that launches a plunger upon detection of an impact, and a detonator or detonating cap.

As the gas generating agents, known agents containing azide or not containing azide, may be used. The gas generating agent containing azide may be selected from those based on inorganic azide, in particular sodium azide, that has been widely used, including an equivalent mixture of soda azide and copper oxide. For the non-azide gas generating agent, there has been proposed various compositions, such as those containing tetrazole, triazole, or those containing a nitrogen containing organic compound of these metal salts or the like, and an oxygen containing oxidizing agent, such as alkali metal nitrate, as major components, or those containing triaminoguanidine nitrate, carbohydrazide, nitroguanidine, dicyandiamide or the like as a fuel and a nitrogen source, and using nitrate, chlorate, or perchlorate of alkali metal or alkaline earth metal as an oxidizing agent. In view of the safety and other aspects, gas generating agents containing no azide are advantageously used.

The coolant/filter functions to remove combustion residues generated by combustion of the gas generating agent, and also functions to cool the combustion gases. For example, a wire screen or mesh sheet made of a stainless steel, such as SUS304, SUS310S, SUS316 (according to Japanese Industrial Standard), is formed into an annular layered body, which is then compressed into a desired shape, for use as a coolant/filter. The coolant/filter may be also formed by combining a filter and a coolant, which have been conventionally widely used.

DETAILED DESCRIPTION OF THE PREFERRED EMBODIMENT

Figure 1:
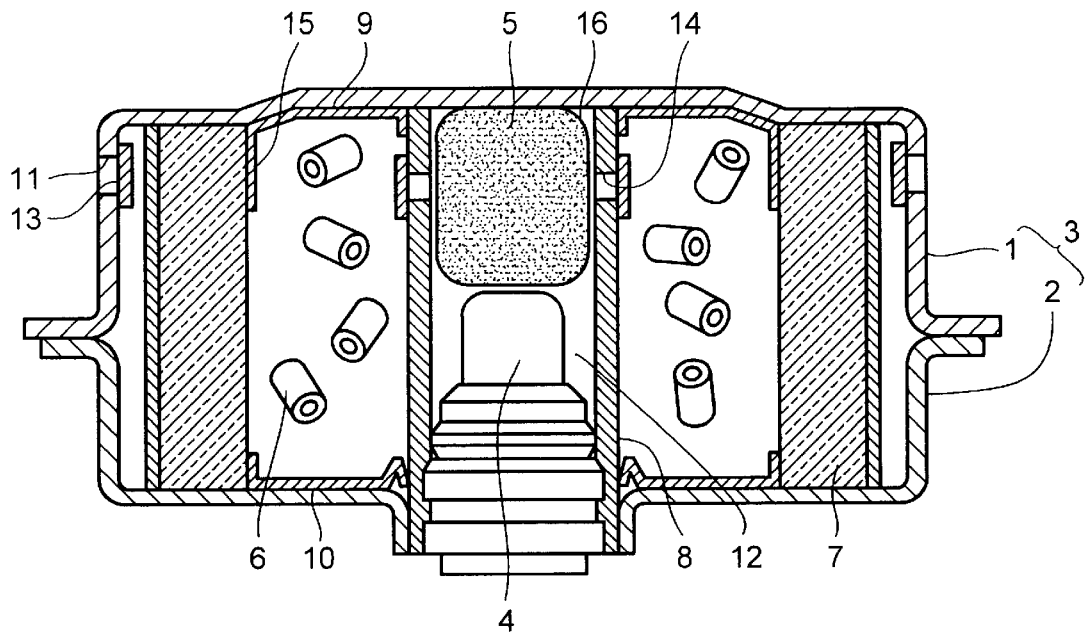
FIG. 1 is a vertical cross sectional view of a gas generator according to one embodiment of the present invention.

FIG. 1 shows a gas generator constructed according to the present invention. The gas generator includes a housing 3 consisting of a diffuser shell 1 and a closure shell 2, a central cylindrical member 8 disposed in the housing 3 to provide a partition wall, igniting means comprising an igniter 4 and a transfer charge 5 disposed in a hollow portion of the central cylindrical member 8, namely, in an igniting means storage chamber 12, and solid masses of gas generating agent 6 that are ignited by the igniting means to generate combustion gases. The gas generator further includes a coolant/filter 7 disposed around the masses of gas generating agent 6, for cooling and purifying the generated gases, and support members in the form of plate members 9, 10 which are disposed at upper and lower end portions of the coolant/filter 7. In this gas generator or inflator, a seal tape 13 is attached to a portion of an outer surface of the central cylindrical member 8 in the housing 3 so as to close through-holes 14 formed in this portion, and a seal tape 13 is attached to a portion of an inner surface of the housing 3 so as to close gas discharge ports 11 through which the generated gases are discharged. These seal tapes serve to prevent moisture from entering the interiors of the housing 3 and central cylindrical member 8.

When a sensor detects an impact, and its signal is transmitted to the igniter 4 of the gas generator, the igniter 4 is actuated to fire the transfer charge 5 in the igniting means storage means 16 thereby generating a high-temperature flame. This flame is ejected through the through-holes 14 to ignite the masses of gas generating agent 6 in the vicinity of the through-holes 14, and then directed downward by a circumferential wall portion 15 of the plate member 9 so as to ignite the masses of gas generating agent 6 in a lower portion of the gas generating agent storage chamber. As a result, the gas generating agent masses 6 are burned to generate high-temperature, high-pressure gases, and the combustion gases thus generated pass through the whole region of the coolant/filter 7 such that the gases are effectively cooled and combustion residues are scavenged or removed during the passage. The combustion gases thus cooled and purified then pass through a gas passage, and rupture the seal tape 13 to be ejected through the gas discharge ports 11 and flow into an air bag.

Figure 2:
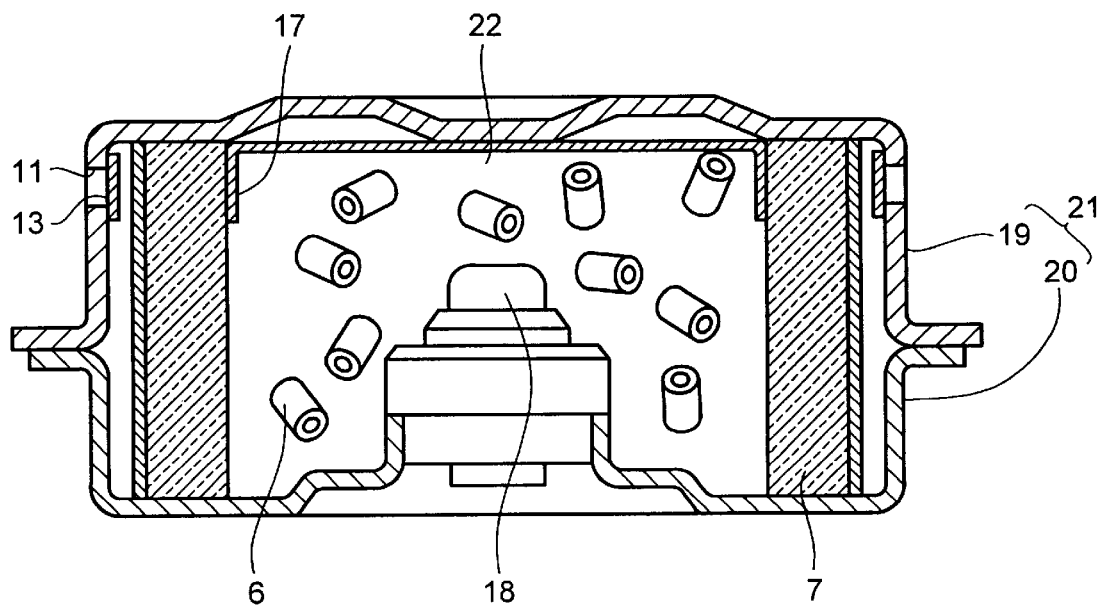
FIG. 2 is a vertical cross sectional view of a gas generator according to another embodiment of the present invention.

FIG. 2 is a cross sectional view of a gas generator for an air bag constructed according to another embodiment of the present invention. The present gas generator includes a housing 21 consisting of a diffuser shell 19 and a closure shell 20, filter means in the form of a coolant/filter for defining a combustion chamber 22 in the housing 21, an igniter 18 disposed in the combustion chamber 22, and solid masses of gas generating agent 6 disposed around the igniter 18. The gas generating agent masses 6 are ignited upon actuation of the igniter 18 to generate combustion gases.

The diffuser shell 19 and closure shell 20 are formed by pressing stainless steel sheets. A plurality of gas discharge ports 11 are formed through an outer peripheral portion of the housing that provides an outer circumferential wall, such that the discharge ports 11 are equally spaced apart from each other in the circumferential direction. The seal tape 13, as described above, is attached to the housing 21 to close the gas discharge ports 11 so as to prevent entry of moisture from the outer space into the gas generator. The plate member 17 serves to restrict movement of the masses of gas generating agent 6 filling the combustion chamber 22. The plate member 17 has an outer circumferential portion which abuts on an inner circumferential surface of one end portion of the coolant/filter 7 to cover this inner circumferential surface, thereby preventing the combustion gases from short-passing through a clearance between the one end portion of the coolant/filter and the inner wall of the diffuser shell, without passing the filter.

Figure 3:
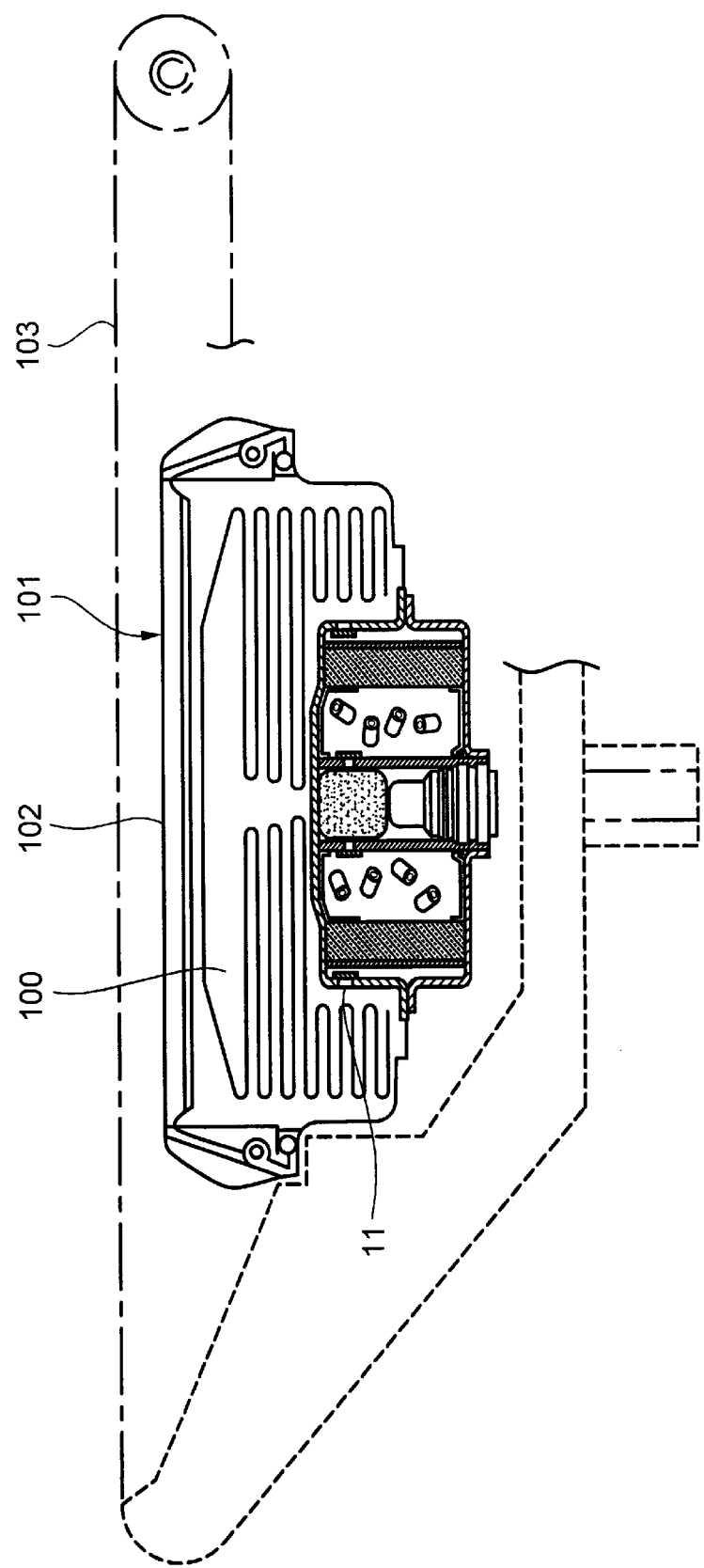
FIG. 3 is a view showing the construction of an air bag system.

FIG. 3 is a view showing the construction of an air bag system. This air bag system includes the above-described gas generator of the present invention, an air bag (bag body) 100, and a module case 101. The gases discharged from the gas discharge ports 11 of the gas generator are ejected into the air bag 100, whereby the air bag 100 breaks the module cover 102 and inflates or expands out of the cover 100, so as to form a cushion for absorbing the impact between a steering wheel 103 and a passenger.

A gas generator, as described based on FIGS. 1–2, is used as the gas generator.

The module case, made of a polyurethane, for example, includes a module cover 102. The airbag 100 and the gas generator are installed inside the module case 101 and form a pad module. The pad module is attached to the steering wheel 103.

The air bag 100 is formed of nylon (nylon 66, for example), or polyester, and fixed to a flange formed on the outer periphery of the gas generator as it is folded, with its opening surrounding the gas discharge ports 11 of the gas generator.

The gas generator of the present invention does not suffer from significant reduction in the combustion capability when the seal tape attached to the partition wall or housing for closing the gas ejection holes or discharge ports has a water vapor permeability that is lower than a reference value determined as a result of a certain experiment. In the air-bag gas generator that is required to be resistant to severe environments for a long period of time, the use of the above seal tape avoids reduction in the combustion speed due to water vapors absorbed by the gas generating agent, assuring improved operating reliability of the air bag upon occurrence of an impact. The gas generator for an air bag as described above may be used to provide an air bag system that operates with increased safety.

EXAMPLES

While some examples of the present invention and comparative examples will be now shown to explain the invention in greater detail, the present invention is by no means limited to the details of these examples.

Example 1
(Evaluation on Water Vapor Permeability of Seal Tape)

A cylinder made of SUS 304 and having a diameter of 35 mm and a height of 17 mm is prepared which has a concavity having a diameter of 10 mm and a depth of 13 mm, and an end face in which a recess having a width of 3 mm and a depth of 1.5 mm is formed so as to receive a moisture-proof packing. A lid in the form of a disc similarly made of SUS 304 is also prepared which has a diameter of 35 mm and a height of 1 mm, and is formed at its center with a 3 mm-diameter hole. A container used for the evaluation may be obtained by fastening this lid to the above cylinder with screws threaded at four locations from the above of the lid, with the packing sandwiched between the lid and the cylinder. A seal tape formed into a square of 10 mm×10 mm is attached to a central portion of the lid of the container, with a force of 5 kg/cm$^2$ being uniformly applied to the seal tape. The container is filled with a gas generating agent accurately measured to 0.8000 g, and the lid to which the seal tape is attached is firmly screwed to the cylinder, such that the seal tape is placed on the inner side of the lid, with a 2 mm-thickness, silicon packing being sandwiched between the lid and the cylinder.

The thus sealed container is left for 24 days under an environment where the temperature is 80° C. or higher, and the humidity is 90% or higher. Then, the container is disassembled, and the weight of the gas generating agent is measured with high accuracy, so as to calculate the rate of increase in the weight per day with respect to 0.8000 g of the gas generating agent.

(Gas Generator for Air Bag)

In the gas generator for an air bag constructed as shown in FIG. 1, the content volume of the housing and the total area of the through-holes are shown below:

Content volume of the housing: 103 cc

Total area of through-holes of housing: 146.01 mm$^2$

Area of outer through-holes: (1.5 mm)$^2$×3.14×18=127.17 mm$^2$

Area of inner through-holes: (1.0 mm)$^2$×3.14×6=18.84 mm$^2$ (Evaluation on Water-vapor Absorption Percentage of Inflator)

In the gas generator for an air bag constructed as described above, a seal tape having a width of 10 mm and a length of 65 mm and a seal tape having a width of 10 mm and a length of 205 mm were firmly pressed by hand against the inner cylindrical portion and outer cylindrical portion of the housing, respectively, so as to completely close the through-holes 14 formed in the inner cylindrical portion, and the gas discharge ports 11 formed in the outer cylindrical portion. The weight of the gas generator was measured after it was left for 20 days in a constant-temperature, constant-humidity chamber kept at a temperature of 80° C. and a humidity of 90%, and a difference between this weight and the weight of the inflator before it was left in the constant-temperature, constant-humidity chamber was calculated. A percentage of this difference with respect to the weight of the gas generating agent was obtained as a water-vapor absorption percentage of the inflator.

(Evaluation on Inflator Combustion)

According to the evaluation method as described above, some characteristics of a moisture-proof seal tape were evaluated. The results of the evaluation on the moisture-proof seal tape used in this example are as follows:

Trade name: Nitofoil AT-50 manufactured by Nitto Denko Corporation

Structure: about 50 μm-thickness aluminum foil and about 50 μm-thickness adhesive Water vapor permeability (rate of increase in the weight per day): 0.030%

Water vapor absorption percentage of inflator: 0.37%

Figure 4:
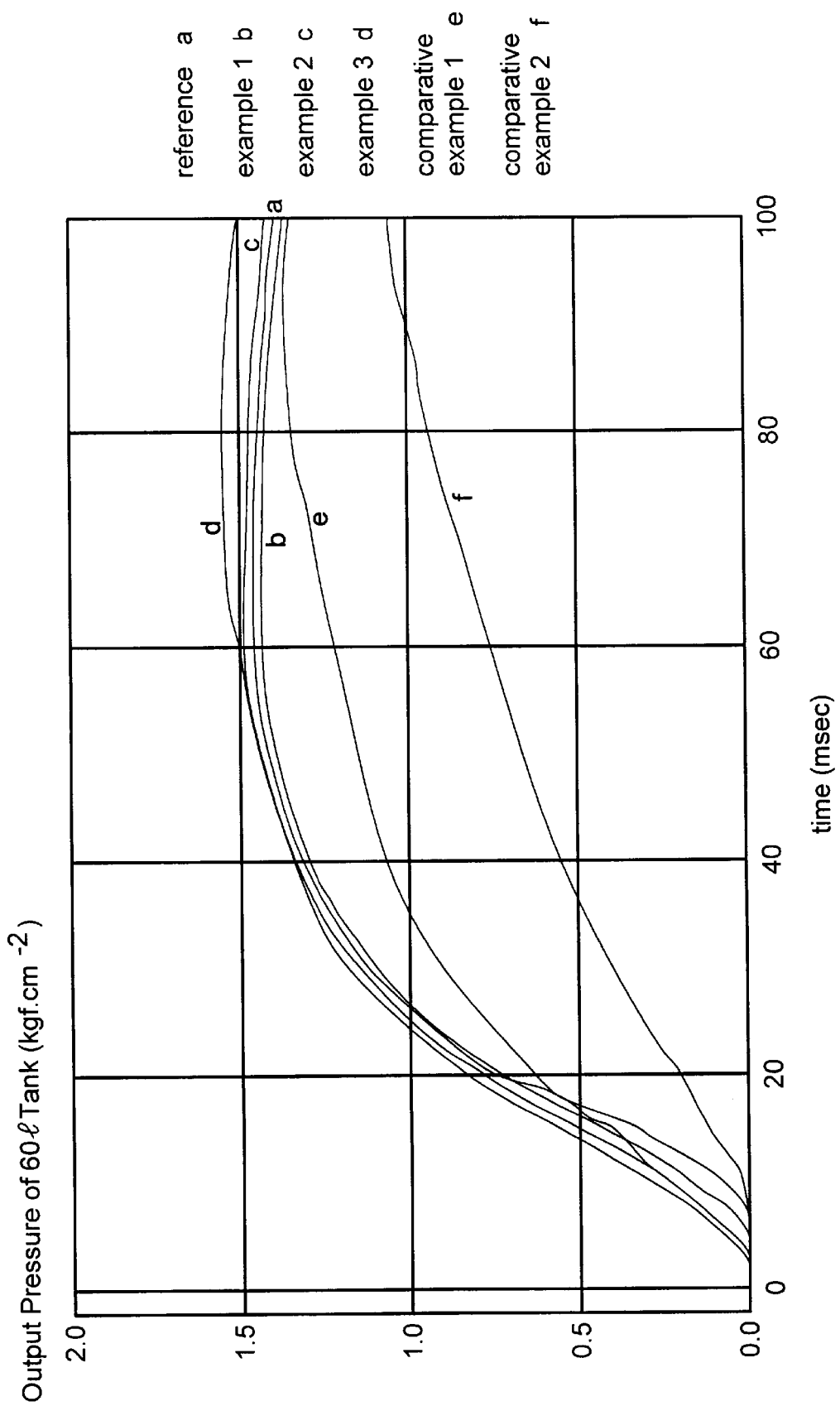
FIG. 4 is a graph showing results of combustion evaluation on inflators.

The combustion in the inflator using the above seal tapes was evaluated. To evaluate the combustion, the temperature of the gas generator was controlled to 20° C. immediately after it was left as described above, and this gas generator was fixed to the inside of a non-inflatable metallic tank of 60 liter, which was then fluid-tightly closed. Then, a signal was transmitted to the gas generator to initiate ignition. FIG. 4 shows a measurement result of pressure changes in the tank detected by a sensor, with respect to time, during the igniting operation of the gas generator. A significant difference was not observed between the thus obtained result, and a result (indicated as reference "a" in FIG. 4) of combustion evaluation on the gas generator which was not left as described above.

Example 2

According to the evaluation method similar to that of Example 1, the characteristics of a moisture-proof seal tape were evaluated. This example is identical with Example 1 except that the seal tape as specified below was used as the moisture-proof seal tapes of the inflator.

Trade name: BYTAC AF-21 manufactured by Norton Company

Structure: about 25 μm-thickness Teflon FEP, about 50 μm-thickness aluminum foil and about 30 μm-thickness adhesive Water vapor permeability (rate of increase in the weight per day): 0.036%

Water vapor absorption percentage of inflator: 1.59%

The result of combustion evaluation on the inflator using the above-specified seal tapes is shown in FIG. 4. A significant difference was not observed between the thus obtained result, and a result of combustion evaluation on the gas generator which was not left as described above.

Comparative Example 1

According to the evaluation method similar to that of Example 1, the characteristics of a moisture-proof seal tape were evaluated. This example is identical with Example 1 except that the seal tape as specified below was used as the moisture-proof seal tapes of the inflator.

Trade name: #433L manufactured by Sumitomo 3M

Structure: about 50 μm-thickness aluminum foil and about 30 μm-thickness adhesive Water vapor permeability (rate of increase in the weight per day): 0.060%

Water vapor absorption percentage of inflator: 5.41%

The result of combustion evaluation on the inflator using the above-specified seal tapes is shown in FIG. 4. A remarkable difference was observed between the thus obtained result, and a result of combustion evaluation on the gas generator which was not left as described above.

Comparative Example 2

According to the evaluation method similar to that of Example 1, the characteristics of a moisture-proof seal tape were evaluated. This example is identical with Example 1 except that the seal tape as specified below was used as the moisture-proof seal tapes of the inflator.

Trade name: #439L manufactured by Sumitomo 3M

Structure: about 50 μm-thickness aluminum foil and about 30 μm-thickness adhesive Water vapor permeability (rate of increase in the weight per day): 0.083%

Water vapor absorption percentage of inflator: 6.81%

The result of combustion evaluation on the inflator using the above-specified seal tapes is shown in FIG. 4. A remarkable difference was observed between the thus obtained result, and a result of combustion evaluation on the gas generator which was not left as described above.

Example 3

According to the evaluation method similar to that of Example 1, the characteristics of a moisture-proof seal tape were evaluated. This example is identical with Example 1 except that the seal tape as specified below was used as the moisture-proof seal tapes of the inflator.

Trade name: Nitofoil AT-80 manufactured by Nitto Denko Corporation

Structure: about 80 μm-thickness aluminum foil and about 50 μm-thickness adhesive Water vapor permeability (rate of increase in the weight per day): 0.037%

Water vapor absorption percentage of inflator: 0.46%

The result of combustion evaluation on the inflator using the above-specified seal tapes is shown in FIG. 4. A significant difference was not observed between the thus obtained result, and a result of combustion evaluation on the gas generator which was not left as described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of manufacturing a gas generator for an airbag, said gas generator including a housing having gas discharge ports and a gas generating agent stored in said housing, comprising the steps of:

preparing a moisture-proof seal tape for preventing said gas generating agent stored in said gas generator from absorbing moisture, said seal tape having a substrate and an adhesive; and attaching said moisture-proof seal tape over said gas discharge ports, wherein said seal tape has a water vapor permeability with which a rate of increase in weight due to moisture absorption by said gas generating agent is not higher than 0.05% per day, the rate of increase in weight being obtained by, preparing a container, having a predetermined content volume, formed of a material having substantially 100% moisture-preventive property, and with no substantial chemical changes and no expansion thereto based on temperature and humidity, the container including at least a lid, which can be closed air tight and having a circular hole formed therethrough, a container body, attaching the moisture-proof seal tape over the circular hole of the lid while uniformly applying a pressure to a surface of the tape, providing a known weight of gas generating agent, and filling the container body with said gas generating agent, attaching the lid to said container body to close said container, placing the closed container for 5 days to 25 days in an atmosphere having a temperature of about 80° C. and a humidity of about 90%, subsequently disassembling said container, measuring the weight of the gas generating agent therein, and calculating the rate of increase in weight per day of said gas generating agent.

2. A method of manufacturing the gas generator according to claim 1, wherein said container has a content volume larger than 1 cc.

3. A method of manufacturing the gas generator according to claim 1, wherein said circular hole in said lid is of about 3 mm in diameter.

4. A method of manufacturing the gas generator according to claim 1, wherein said gas generating agent has a weight of at least 0.8 g.

5. A method of manufacturing the gas generator according to claim 1, wherein said moisture-proof seal tape is formed into a square of about 10 mm×10 mm and attached over said circular hole while uniformly applying the pressure of about 5 kg/cm$^2$ to the surface of said moisture-proof seal tape.

6. A method of selecting a moisture-proof seal tape as a seal member to be used in an airbag inflator for controlling moisture absorption by a gas generating agent provided within an inflator housing, said moisture-proof seal tape including a substrate and an adhesive, comprising the steps of:

evaluating a water vapor permeability of said moisture-proof seal tape based on the following procedure;

preparing a container, having a predetermined content volume, formed of a material having substantially 100% moisture-preventive property, and the container including at least a lid, which can provide an air tight closure with said container and having a circular hole formed therethrough and a container body for receiving said lid;

attaching said moisture-proof seal tape over the circular hole in said lid while uniformly applying pressure to a surface of said moisture-proof seal tape;

measuring the weight of a quantity of the gas generating agent, and filling said container body with said quantity of the gas generating agent;

attaching the lid to said container body to provide an air tight closure;

leaving the closed container for 5 days to 25 days in an atmosphere having a temperature of about 80° C. and humidity of about 90%;

disassembling the container;

measuring the weight of said quantity of the gas generating agent;

obtaining a rate of increase in weight per day with respect to said quantity of gas generating agent; and selecting said moisture-proof seal tape having a desired water vapor permeability by determining that the rate of increase in weight per day due to moisture absorption therein with such seal tape in place on said container is not higher than 0.05% per day.

7. A method of selecting a moisture-proof seal tape according to claim 6, wherein said step of preparing the container further includes the step of, selecting a content volume larger than 1 cc for said container.

8. A method of selecting a moisture-proof seal tape according to claim 6, wherein said step of preparing the container further includes the step of, providing a circular hole of about 3 mm-diameter in said lid.

9. A method of selecting a moisture-proof seal tape according to claim 6, wherein said step of measuring the weight of the gas generating agent further includes the step of, providing at least 0.8 g of the gas generating agent.

10. A method of selecting a moisture-proof seal tape according to claim 6, wherein said step of attaching said moisture-proof seal tape further includes the step of, attaching said moisture-proof seal tape formed into a square of about 10 mm×10 mm over said circular hole while uniformly applying pressure of about 5 kg/cm$^2$ to the surface of said moisture-proof seal tape.

11. A method of selecting a moisture-proof seal tape as a seal member to be used in an airbag inflator for controlling moisture absorption by a gas generating agent provided within an inflator housing, the inflator housing having gas discharge ports for discharging combustion gas generated by combustion of the gas generating agent, said moisture-proof seal tape including a substrate and adhesive, comprising the steps of:

attaching said moisture-proof seal tape on the inflator housing including a quantity of said gas generating agent of known weight therein to completely close said gas discharge ports;

leaving the inflator for at least 20 days in a constant-temperature, constant-humidity chamber maintained at a temperature of about 80° C. and a humidity of about 90%;

thereafter determining any increase in weight of the gas generating agent due to water vapor absorption over the at least 20 day time interval; and selecting said moisture-proof seal tape having a desired water vapor permeability by determining that the increase in weight due to moisture absorption by the gas generating agent is not higher than about 2.0%.

* * * * *